United States Patent
Pal et al.

(10) Patent No.: US 11,143,104 B2
(45) Date of Patent: Oct. 12, 2021

(54) THERMAL MANAGEMENT SYSTEM

(71) Applicant: General Electric Company, Schenectady, NY (US)

(72) Inventors: Kishanjit Pal, Bangalore (IN); Arnab Sen, Bangalore (IN); Pranav R. Kamat, Bangalore (IN); Brandon Wayne Miller, Liberty Township, OH (US); Daniel Alan Niergarth, Norwood, OH (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 15/899,831

(22) Filed: Feb. 20, 2018

(65) Prior Publication Data

US 2019/0257247 A1   Aug. 22, 2019

(51) Int. Cl.
*F02C 7/18* (2006.01)
*F02C 3/04* (2006.01)
(Continued)

(52) U.S. Cl.
CPC .............. *F02C 7/18* (2013.01); *F02C 3/04* (2013.01); *F02C 7/143* (2013.01); *F02C 9/00* (2013.01);
(Continued)

(58) Field of Classification Search
CPC ...... F02C 3/04; F02C 7/10; F02C 7/14; F02C 7/141; F02C 7/143; F02C 7/16;
(Continued)

(56) References Cited

U.S. PATENT DOCUMENTS

| | | |
|---|---|---|
| 2,582,842 A | 1/1952 | Messinger |
| 3,895,243 A | 7/1975 | Amend et al. |

(Continued)

FOREIGN PATENT DOCUMENTS

| | | |
|---|---|---|
| EP | 1609954 A1 | 12/2005 |
| EP | 1798381 A2 | 6/2007 |

(Continued)

OTHER PUBLICATIONS

U.S. Appl. No. 15/368,227, filed Dec. 2, 2016.
U.S. Appl. No. 15/796,991, filed Oct. 31, 2017.
U.S. Appl. No. 15/819,327, filed Nov. 21, 2017.
U.S. Appl. No. 15/819,443, filed Nov. 21, 2017.

*Primary Examiner* — Jason H Duger
(74) *Attorney, Agent, or Firm* — Dority & Manning, P.A.

(57) ABSTRACT

A method of operating a thermal management system for a gas turbine engine includes determining the gas turbine engine is in a first operating mode; transferring heat from a first heat source exchanger to a heat sink system in response to determining the gas turbine engine is in the first operation mode, the first heat source exchanger thermally coupled to a first system/component of the gas turbine engine; determining the gas turbine engine is in a second operating mode, the second operating mode being different than the first operating mode; and transferring heat from a second heat source exchanger to the heat sink system in response to determining the gas turbine engine is in the second operation mode, the second heat source exchanger thermally coupled to a second system/component of the gas turbine engine, the second system/component being different than the first system/component.

17 Claims, 6 Drawing Sheets

(51) Int. Cl.
*F02C 9/18* (2006.01)
*F02C 9/00* (2006.01)
*F02C 7/143* (2006.01)

(52) U.S. Cl.
CPC .......... *F02C 9/18* (2013.01); *F05D 2220/323* (2013.01); *F05D 2260/213* (2013.01); *F05D 2260/606* (2013.01)

(58) Field of Classification Search
CPC .... F02C 7/18; F02C 7/185; F02C 9/00; F02C 9/18; F02C 9/28; F02C 9/44; F05D 2220/323; F05D 2260/213; F05D 2260/606; F02K 3/08
See application file for complete search history.

(56) References Cited

U.S. PATENT DOCUMENTS

| | | |
|---|---|---|
| 4,229,944 A | 10/1980 | Weiler |
| 4,317,646 A | 3/1982 | Steel et al. |
| 4,505,124 A | 3/1985 | Mayer |
| 4,525,998 A | 7/1985 | Schwarz |
| 4,550,573 A | 11/1985 | Rannenberg |
| 4,773,212 A | 9/1988 | Griffin et al. |
| 4,826,397 A | 5/1989 | Shook et al. |
| 4,928,240 A | 5/1990 | Davison et al. |
| 4,991,394 A | 2/1991 | Wright |
| 5,012,420 A | 4/1991 | Walker et al. |
| 5,149,018 A | 9/1992 | Clark |
| 5,174,714 A | 12/1992 | Plemmons et al. |
| 5,181,559 A | 1/1993 | Svoboda |
| 5,341,636 A | 8/1994 | Paul |
| 5,399,066 A | 3/1995 | Ritchie et al. |
| 5,452,573 A | 9/1995 | Glickstein et al. |
| 5,667,168 A | 9/1997 | Fluegel |
| 5,722,241 A | 3/1998 | Huber |
| 5,724,806 A | 3/1998 | Homer |
| 5,730,088 A | 3/1998 | Foley et al. |
| 5,899,660 A | 5/1999 | Dodd |
| 6,106,229 A | 8/2000 | Nikkanen et al. |
| 6,182,435 B1 | 2/2001 | Niggemann et al. |
| 6,224,328 B1 | 5/2001 | Weigand et al. |
| 6,250,097 B1 | 6/2001 | Lui et al. |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,817,189 B2 | 11/2004 | Boeck |
| 6,974,306 B2 | 12/2005 | Djeridane et al. |
| 7,254,937 B2 | 8/2007 | Hull et al. |
| 7,254,951 B2 | 8/2007 | Lockwood, Jr. |
| 7,260,926 B2 | 8/2007 | Sabatino et al. |
| 7,377,098 B2 | 5/2008 | Walker et al. |
| 7,398,641 B2 | 7/2008 | Stretton et al. |
| 7,491,029 B2 | 2/2009 | Pezzetti, Jr. et al. |
| 7,503,179 B2 | 3/2009 | Estridge et al. |
| 7,597,537 B2 | 10/2009 | Bucaro et al. |
| 7,681,339 B2 | 3/2010 | Orlando et al. |
| 7,823,389 B2 | 11/2010 | Seitzer et al. |
| 7,836,680 B2 | 11/2010 | Schwarz et al. |
| 7,882,704 B2 | 2/2011 | Chen |
| 7,946,806 B2 | 5/2011 | Murphy |
| 7,966,807 B2 | 6/2011 | Norris et al. |
| 7,987,676 B2 | 8/2011 | Ast et al. |
| 8,056,345 B2 | 11/2011 | Norris et al. |
| 8,126,628 B2 | 2/2012 | Hershey et al. |
| 8,162,593 B2 | 4/2012 | Guimbard et al. |
| 8,177,884 B2 | 5/2012 | Schmidt et al. |
| 8,205,426 B2 | 6/2012 | Schilling |
| 8,261,258 B1 | 9/2012 | Chillar et al. |
| 8,266,888 B2 | 9/2012 | Liu |
| 8,307,662 B2 | 11/2012 | Turco |
| 8,342,798 B2 | 1/2013 | Floyd, II et al. |
| 8,371,127 B2 | 2/2013 | Durocher et al. |
| 8,434,997 B2 | 5/2013 | Pinero et al. |
| 8,438,835 B2 | 5/2013 | Perveiler et al. |
| 8,459,040 B2 | 6/2013 | Glahn et al. |
| 8,490,382 B2 | 7/2013 | Zysman et al. |
| 8,499,822 B2 | 8/2013 | Bulin et al. |
| 8,522,572 B2 | 9/2013 | Coffinbeny et al. |
| 8,756,910 B2 | 6/2014 | Donovan et al. |
| 8,763,363 B2 | 7/2014 | Ranganathan |
| 8,765,070 B2 | 7/2014 | Norton et al. |
| 8,776,952 B2 | 7/2014 | Schwarz et al. |
| 8,783,040 B2 | 7/2014 | Erickson et al. |
| 8,789,377 B1 | 7/2014 | Brostmeyer |
| 8,858,161 B1 | 10/2014 | Ryznic et al. |
| 8,881,397 B1 | 11/2014 | Dowd |
| 8,899,008 B2 | 12/2014 | Jones et al. |
| 8,944,367 B2 | 2/2015 | Bystry, Jr. et al. |
| 8,961,114 B2 | 2/2015 | Ruthemeyer |
| 8,978,353 B2 | 3/2015 | Norton et al. |
| 8,984,884 B2 | 3/2015 | Xu et al. |
| 8,998,563 B2 | 4/2015 | Rioux |
| 9,004,853 B2 | 4/2015 | Puerta et al. |
| 9,014,791 B2 | 4/2015 | Held |
| 9,038,397 B2 | 5/2015 | Papa et al. |
| 9,079,803 B2 | 7/2015 | Xu |
| 9,109,608 B2 | 8/2015 | Little et al. |
| 9,120,580 B2 | 9/2015 | Sampath |
| 9,212,623 B2 | 12/2015 | Murphy et al. |
| 9,243,563 B2 | 1/2016 | Lo |
| 9,260,974 B2 | 2/2016 | Hasting et al. |
| 9,297,391 B2 | 3/2016 | Rued et al. |
| 9,341,074 B2 | 5/2016 | Schimmels et al. |
| 9,410,482 B2 | 8/2016 | Krautheim et al. |
| 9,422,063 B2 | 8/2016 | Diaz |
| 9,567,095 B2 | 2/2017 | McCarthy et al. |
| 9,580,185 B2 | 2/2017 | Rhoden et al. |
| 9,587,561 B2 | 3/2017 | Snyder et al. |
| 9,611,744 B2 | 4/2017 | Taylor |
| 9,776,727 B2 | 10/2017 | Ellis et al. |
| 2005/0235626 A1* | 10/2005 | Hull .................... F02C 7/10 60/39.511 |
| 2007/0086887 A1 | 4/2007 | Pezzetti, Jr. et al. |
| 2009/0133380 A1 | 5/2009 | Donnerhack |
| 2009/0188234 A1 | 7/2009 | Suciu et al. |
| 2010/0107594 A1* | 5/2010 | Coffinberry ............... F02C 6/08 60/39.093 |
| 2010/0212857 A1 | 8/2010 | Bulin et al. |
| 2010/0313591 A1 | 12/2010 | Lents et al. |
| 2011/0027068 A1 | 2/2011 | Floyd, II et al. |
| 2011/0088405 A1* | 4/2011 | Turco .................... F01D 5/081 60/782 |
| 2011/0171007 A1 | 7/2011 | Johnson et al. |
| 2012/0128467 A1 | 5/2012 | Ruthemeyer |
| 2012/0216502 A1 | 8/2012 | Freund et al. |
| 2013/0015609 A1 | 1/2013 | Landau |
| 2013/0186100 A1 | 7/2013 | Rhoden et al. |
| 2013/0233526 A1 | 9/2013 | Hislop |
| 2013/0280081 A1 | 10/2013 | Propheter-Hinckley et al. |
| 2013/0302154 A1 | 11/2013 | Finlayson |
| 2014/0030066 A1 | 1/2014 | Schimmels et al. |
| 2014/0161601 A1 | 6/2014 | Geiger |
| 2014/0165570 A1 | 6/2014 | Herring |
| 2014/0205446 A1 | 7/2014 | Patsouris et al. |
| 2014/0216042 A1 | 8/2014 | Hanson |
| 2014/0321984 A1 | 10/2014 | Welch et al. |
| 2014/0345254 A1 | 11/2014 | Dawson et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2016/0108814 A1 | 4/2016 | Schmitz |
| 2016/0131035 A1 | 5/2016 | Diaz et al. |
| 2016/0131036 A1 | 5/2016 | Bintz et al. |
| 2016/0178285 A1 | 6/2016 | Pal et al. |
| 2016/0186606 A1 | 6/2016 | Blaney et al. |
| 2016/0201989 A1 | 7/2016 | Martinez et al. |
| 2016/0230671 A1* | 8/2016 | Thiriet .................... F02C 6/18 |
| 2016/0290214 A1 | 10/2016 | Ekanayake et al. |
| 2016/0290233 A1 | 10/2016 | Ekanayake et al. |
| 2016/0312702 A1 | 10/2016 | Thomas |
| 2016/0312740 A1* | 10/2016 | Kupratis .................... F02C 3/10 |
| 2016/0326915 A1 | 11/2016 | Baladi |

(56) References Cited

U.S. PATENT DOCUMENTS

| | | |
|---|---|---|
| 2016/0369700 A1 | 12/2016 | Ribarov et al. |
| 2016/0369706 A1 | 12/2016 | Suciu et al. |
| 2017/0030266 A1* | 2/2017 | Cerny .................... F02C 7/185 |
| 2017/0033641 A1 | 2/2017 | Pera et al. |
| 2017/0114667 A1 | 4/2017 | Sabo et al. |
| 2017/0114721 A1 | 4/2017 | Miller et al. |
| 2017/0122210 A1 | 5/2017 | Schwarz et al. |
| 2017/0138372 A1 | 5/2017 | Subramanian et al. |
| 2017/0159566 A1 | 6/2017 | Sennoun et al. |
| 2017/0159675 A1 | 6/2017 | Sennoun et al. |
| 2017/0167382 A1 | 6/2017 | Miller et al. |
| 2017/0175563 A1 | 6/2017 | Chaudhari et al. |
| 2017/0184024 A1 | 6/2017 | Sennoun |
| 2017/0204807 A1 | 7/2017 | Chillapalli et al. |
| 2017/0254229 A1 | 9/2017 | Fletcher |

FOREIGN PATENT DOCUMENTS

| | | |
|---|---|---|
| EP | 2003311 A2 | 12/2008 |
| EP | 3018304 A1 | 5/2016 |
| EP | 3075957 A1 | 10/2016 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |
| WO | WO2014/051678 A1 | 4/2014 |
| WO | WO2015/012911 A2 | 1/2015 |
| WO | WO2015/069145 A1 | 5/2015 |

* cited by examiner

THERMAL MANAGEMENT SYSTEM

FIELD

The present subject matter relates generally to a thermal management system and a method for operating the same.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts. During operation of the gas turbine engine, various systems may generate a relatively large amount of heat. Thermal management systems of the gas turbine engine may collect heat from one or more of these systems to maintain a temperature of such systems within an acceptable operating range. The thermal management systems may reject such heat through one or more heat exchangers.

However, the inventors of the present disclosure have found that further benefits may be achieved by operating the thermal management system to selectively add or remove heat from various systems or locations of the gas turbine engine. Accordingly, a system and/or method for operating a thermal management system in a manner to increase an efficiency of the gas turbine engine would be useful.

BRIEF DESCRIPTION

Aspects and advantages of the invention will be set forth in part in the following description, or may be obvious from the description, or may be learned through practice of the invention.

In one exemplary aspect of the present disclosure a method of operating a thermal management system for a gas turbine engine is provided. The method includes determining the gas turbine engine is in a first operating mode; transferring heat from a first heat source exchanger to a heat sink system in response to determining the gas turbine engine is in the first operation mode, the first heat source exchanger thermally coupled to a first system or component of the gas turbine engine; determining the gas turbine engine is in a second operating mode, the second operating mode being different than the first operating mode; and transferring heat from a second heat source exchanger to the heat sink system in response to determining the gas turbine engine is in the second operation mode, the second heat source exchanger thermally coupled to a second system or component of the gas turbine engine, the second system or component being different than the first system or component.

In certain exemplary aspects the first system or component of the gas turbine engine is one of a cooling passage between a compressor section and a turbine section of the gas turbine engine, an exhaust section of the gas turbine engine, or a turbine section of the gas turbine engine, and wherein the second system or component is a different one of the cooling passage, the exhaust section of the gas turbine engine, or the turbine section of the gas turbine engine.

For example, in certain exemplary aspects the first heat source exchanger is thermally coupled to the cooling passage between the compressor section and the turbine section of the gas turbine engine.

For example, in certain exemplary aspects transferring heat from the first heat source exchanger to the heat sink system includes extracting heat from a flow of cooling air through the cooling passage.

For example, in certain exemplary aspects the second heat source exchanger is thermally coupled to the exhaust section of the gas turbine engine.

For example, in certain exemplary aspects transferring heat from the second heat source exchanger to the heat sink system includes extracting heat from a flow of gas through the exhaust section of the gas turbine engine.

In certain exemplary aspects the first operating mode is a high-power output operating mode, and wherein the second operating mode is a cruise operating mode.

In certain exemplary aspects the method further includes determining the gas turbine engine is in a third operating mode, the third operating mode being different than the first operating mode and the second operating mode; and transferring heat from a third heat source exchanger to the heat sink system in response to determining the gas turbine engine is in the third operation mode, the third heat source exchanger thermally coupled to a third system or component of the gas turbine engine, the third system or component being different than the first system or component and different than the second system or component.

For example, in certain exemplary aspects the third system or component is one of the cooling passage, the exhaust section of the gas turbine engine, or the turbine section of the gas turbine engine.

For example, in certain exemplary aspects the third heat source exchanger is thermally coupled to the turbine section of the gas turbine engine, and wherein transferring heat from the third heat source exchanger to the heat sink system includes extracting heat from a flow of gases through the turbine section of the gas turbine engine.

For example, in certain exemplary aspects the turbine section includes a high pressure turbine and a low pressure turbine, and wherein extracting heat from the flow of gases through the turbine section of the gas turbine engine includes extracting heat from the flow of gases through the turbine section at a location within or upstream of the low pressure turbine.

For example, in certain exemplary aspects the third operating mode is an idle operating mode.

In certain exemplary aspects transferring heat from the first heat source exchanger to the heat sink system includes thermally connecting the first heat source exchanger to the heat sink system, and wherein transferring heat from the second heat source exchanger to the heat sink system includes thermally connecting the second heat source exchanger to the heat sink system.

In certain exemplary aspects transferring heat from the first heat source exchanger to the heat sink system further includes substantially thermally disconnecting all heat source exchangers of the thermal management system, other than the first heat source exchanger, from the heat sink system, and wherein transferring heat from the second heat source exchanger to the heat sink system further includes substantially thermally disconnecting all heat source exchangers of the thermal management system, other than the second heat source exchanger, from the heat sink system.

In certain exemplary aspects the heat sink system includes a heat sink exchanger positioned to provide heat to a bypass airflow through a bypass airflow passage of the gas turbine engine.

In certain exemplary aspects the first system or component of the gas turbine engine is one of a compressor section of the gas turbine engine or a turbine section of the gas turbine engine, and wherein the second system or component is a different one of the compressor section of the gas turbine engine or the turbine section of the gas turbine engine.

In an exemplary embodiment of the present disclosure, a gas turbine engine is provided. The gas turbine engine includes a compressor section; a combustion section located downstream of the compressor section; a turbine section located downstream of the combustion section; an exhaust section located downstream of the turbine section; and a thermal management system. The thermal management system includes a cooling passage in airflow communication with the compressor section and the turbine section for providing a flow of cooling air from the compressor section to the turbine section; a first heat source exchanger in thermal communication with one of the cooling passage, the turbine section, or the exhaust section; a second heat source exchanger in thermal communication with a different one of the cooling passage, the turbine section, or the exhaust section; a heat sink system; and a controller configured to determine an operating condition of the gas turbine engine and selectively thermally connect the first heat source exchanger or the second heat source exchanger to the heat sink system.

In certain exemplary embodiments the gas turbine engine defines a bypass airflow passage, and wherein the heat sink system is positioned to provide heat to a bypass airflow through the bypass airflow passage.

In certain exemplary embodiments the first heat source exchanger is in thermal communication with the cooling passage.

For example, in certain exemplary embodiments the second heat source exchanger is in thermal communication with the exhaust section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
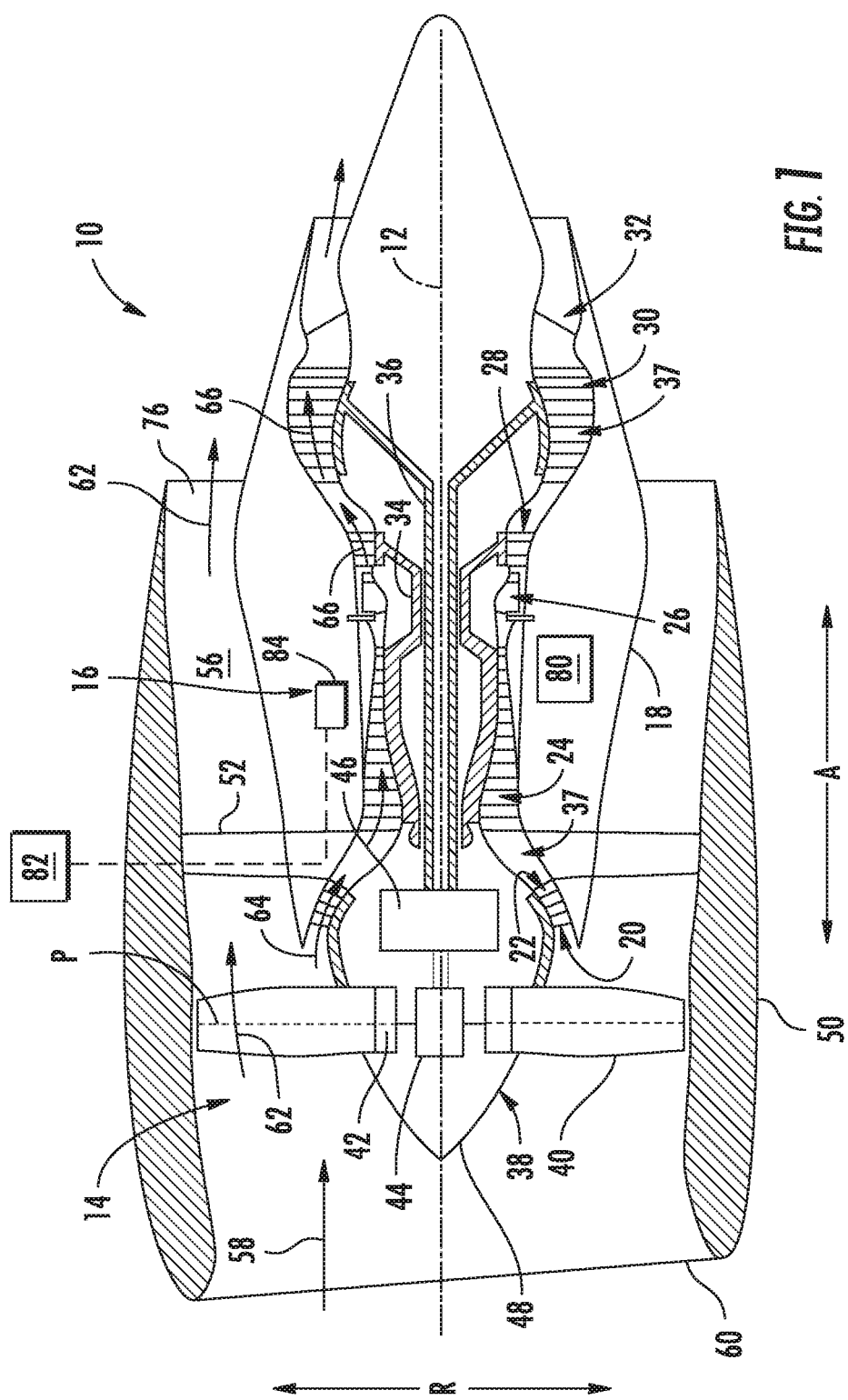
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66.

Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Further, the exemplary turbofan engine 10 includes a controller 82 operably connected at least to one or more engine sensors 84. The one or more engine sensors 84 may be configured to sense data indicative of operating parameters of the turbofan engine 10 (such as one or more of a compressor exit pressure and/or temperature, a turbine inlet temperature, a rotational speed of the high speed components/HP shaft 34, a rotational speed of the low speed components/LP shaft 36, etc.). The controller 82 may also be configured to receive data, such as command data, from one or more users or operators of the turboshaft engine 10 (such as a pilot). Based on this data received, either by the users or operators, or by the one or more sensors 84, the controller 82 may be configured to determine an operating condition of the turboshaft engine 10, such as a climb operating condition, a cruise operating condition, an idle operating condition, etc. The controller 82 may be configured in the same manner as the exemplary control system 300 described below with reference to FIG. 10.

Moreover, it will be appreciated that the exemplary turbofan engine 10 further includes various accessory systems to aid in the operation of the turbofan engine 10 and/or an aircraft including the turbofan engine 10. For example, the exemplary turbofan engine 10 further includes a cooling air (CCA) system 80 (sometimes also referred to as a "compressor cooling air system" or "cooled cooling air system") for providing (and cooling) air from one or both of the HP compressor 24 or LP compressor 22 to one or both of the HP turbine 28 or LP turbine 30. For example, the cooling air system 80 may include a cooling duct and a heat exchanger for providing such functionality (see, e.g., FIG. 3, below).

Prior turbofan engines 10 and/or aircrafts included individual heat exchangers for each of these accessory systems to remove heat from air and/or lubrication in such systems. However, aspects of the present disclosure may include a thermal management system 100 (see FIG. 2) for transferring heat from some or all of such accessory systems to more efficiently remove such heat and/or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., two spools, three spools), etc. Further, in certain exemplary embodiments, aspects of the present disclosure may further apply to any other suitable aeronautical gas turbine engine, such as a turbojet engine, turboshaft engine, turboprop engine, etc., whether operated as a subsonic gas turbine engine (i.e., configured to operate mainly at subsonic flight speeds) or as a supersonic gas turbine engine (i.e., configured to operate mainly at supersonic flight speeds). Additionally, in still other exemplary embodiments, the exemplary turbofan engine 10 may include or be operably connected to any other suitable accessory systems and may be configured in any other suitable manner. Additionally, or alternatively, the exemplary turbofan engine 10 may not include or be operably connected to one or more of the accessory systems discussed above.

Figure 2:
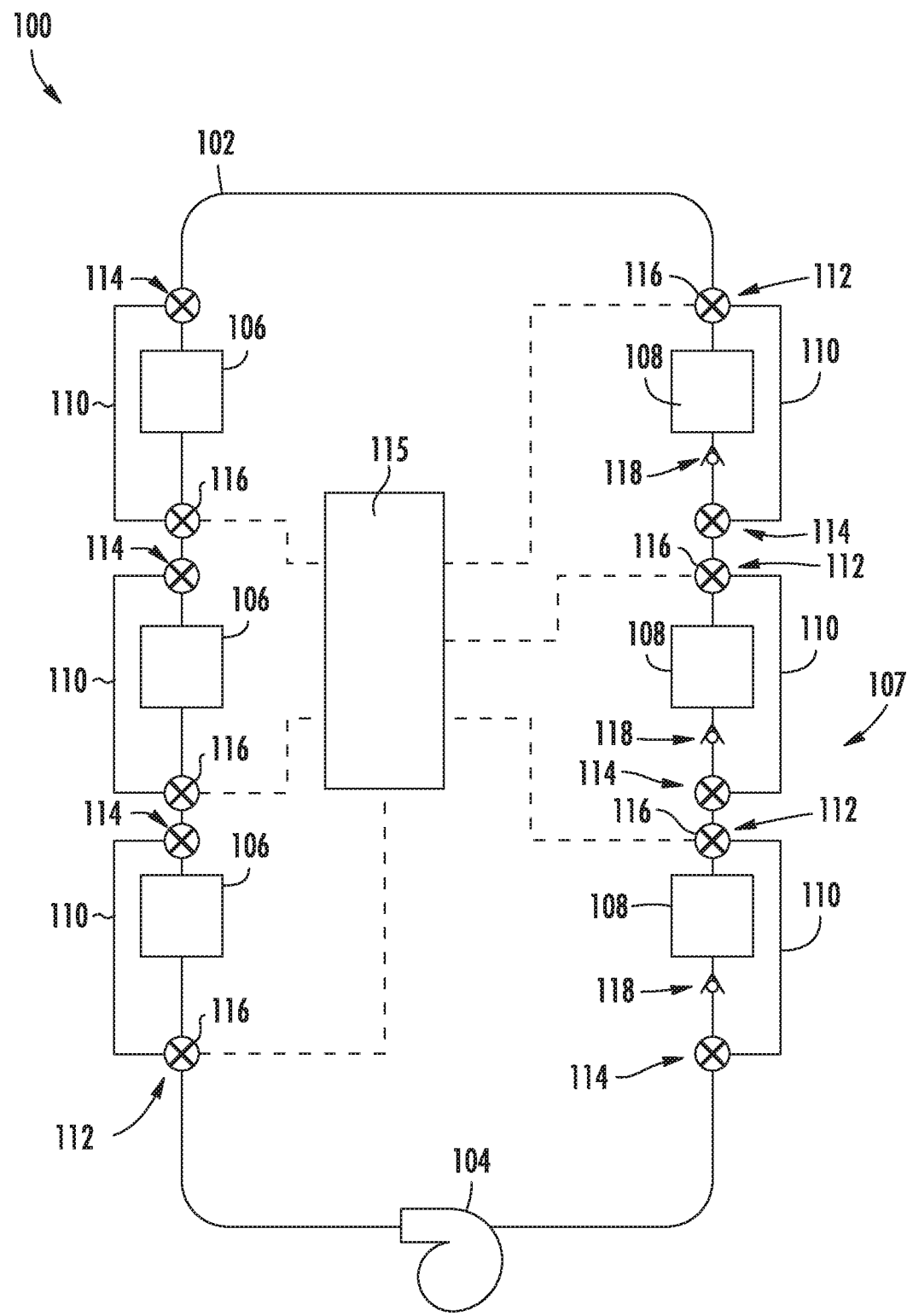
FIG. 2 is a simplified schematic view of a thermal management system in accordance with an exemplary embodiment of the present disclosure.

Referring now to FIG. 2, a schematic, flow diagram is provided of a thermal management system 100 in accordance with an exemplary embodiment of the present disclosure for incorporation at least partially into a gas turbine engine, such as the exemplary turbofan engine 10 of FIG. 1.

As shown, the thermal management system 100 generally includes a thermal transport bus 102. The thermal transport bus 102 includes an intermediary heat exchange fluid flowing therethrough and may be formed of one or more suitable fluid conduits. The heat exchange fluid may have a high temperature operating range. A pump 104 is provided in fluid communication with the heat exchange fluid in the thermal transport bus 102 for generating a flow of the heat exchange fluid in/through the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10. In still other embodiments, the pump 104 may be powered by an auxiliary turbine, which in turn may be powered by bleed air from a compressor section of a gas turbine engine within which the system 100 is incorporated.

Moreover, the exemplary thermal management system 100 includes one or more heat source heat exchangers 106 in thermal communication with the thermal transport bus 102, or rather, in fluid communication with the heat exchange fluid within the thermal transport bus 102. Specifically, the thermal management system 100 depicted includes a plurality of heat source heat exchangers 106. The plurality of heat source heat exchangers 106 are each configured to transfer heat from one or more of the accessory systems of the turbofan engine 10 (or operable with the turbofan engine 10) to the heat exchange fluid in the thermal transport bus 102. For example, in certain exemplary embodiments, the plurality of heat source heat exchangers 106 may include one or more of: a heat recovery heat exchanger, such as a waste heat recovery heat exchanger, positioned in, e.g., the exhaust section for recovering heat from an airflow therethrough; a CCA system heat source exchanger for transferring heat from a CCA system (such as CCA system 80); a turbine section heat exchanger for removing heat from an airflow through one or both of a high pressure or low pressure turbine; etc. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are three heat source heat exchangers 106, the three heat source heat exchangers 106 each arranged in series flow along the thermal transport bus 102. However, in other exemplary embodiments, any other suitable number of heat source heat exchangers 106 may be included and one or more of the heat source heat exchangers 106 may be arranged in parallel flow along the thermal transport bus 102. For example, in other embodiments, there may be two heat source heat exchangers 106, four heat source heat exchangers 106, five heat source heat exchangers 106, six heat source heat exchangers 106 in thermal communication with heat exchange fluid in the thermal transport bus 102, or more.

Additionally, the exemplary thermal management system 100 of FIG. 2 further includes a heat sink system 107 in thermal communication with the thermal bus 102. The heat sink system 107 includes one or more heat sink exchangers 108 that are in thermal communication with the thermal transport bus 102, or rather in fluid communication with the heat exchange fluid in the thermal transport bus 102. The one or more heat sink exchangers 108 are located downstream of the plurality of heat source exchangers 106 and are configured for transferring heat from the heat exchange fluid in the thermal transport bus 102, e.g., to atmosphere, to fuel, to a bypass airflow/fan stream, etc. For example, in certain embodiments the one or more heat sink exchangers 108 may include at least one of a fuel heat exchanger, a bypass airflow heat exchanger, a RAM heat exchanger, a bleed air heat exchanger, an engine intercooler, a cold air output of an air cycle system, a de-icing (or anti-icing) system, or any other suitable heat sink of the gas turbine engine. The fuel heat exchanger may be a "fluid to heat exchange fluid" heat exchanger wherein heat from the heat exchange fluid is transferred to a stream of liquid fuel for the turbofan engine 10 (by, e.g., a fuel delivery system). Moreover, the fan stream heat exchanger, and other heat exchangers, may generally be "air to heat exchange fluid" heat exchangers which flow, e.g., bypass air from a bypass airflow passage over heat exchange fluid to remove heat from the heat exchange fluid.

For the embodiment of FIG. 2, the one or more heat sink exchangers 108 of the thermal management system 100 depicted includes a plurality of individual heat sink exchangers 108. More particularly, for the embodiment of FIG. 2, the one or more heat sink exchangers 108 include three heat sink exchangers 108 arranged in series. However, in other exemplary embodiments, the one or more heat sink exchangers 108 may include any other suitable number of heat sink exchangers 108. For example, in other exemplary embodiments, a single heat sink exchanger 108 may be provided, two heat sink exchangers 108 may be provided, four heat sink exchangers 108 may be provided, etc. Additionally, in still other exemplary embodiments, two or more of the heat sink exchangers 108 may alternatively be arranged in parallel flow with one another.

Referring still to the exemplary embodiment depicted in FIG. 2, it will be appreciated that the plurality of heat sink exchangers 108 and heat source exchangers 106 are each selectively in thermal communication with the thermal transport bus 102 (and selectively in fluid communication with the heat exchange fluid in the thermal transport bus 102). More particularly, the thermal management system 100 depicted includes a plurality of bypass lines 110 for selectively bypassing each heat sink exchanger 108 of the plurality of heat sink exchangers 108 and heat source exchanger 106 of the plurality of heat source heat exchangers 106. Each bypass line 110 extends between an upstream juncture 112 and a downstream juncture 114—the upstream juncture 112 located just upstream of a respective heat sink exchanger 108 or heat source heat exchanger 106, and the downstream juncture 114 located just downstream of the respective heat sink exchanger 108 or heat source heat exchanger 106. Additionally, each bypass line 110 meets at the respective upstream juncture 112 with the thermal transport bus 102 via a bypass valve 116. The bypass valves 116 each include an inlet fluidly connected with the thermal transport bus 102, a first outlet fluidly connected with the thermal transport bus 102, and a second outlet fluidly connected with the bypass line 110. The bypass valves 116 may each be a variable throughput three-way valve, such that the bypass valves 116 may vary a throughput from the inlet to the first and/or second outlets. For example, the bypass valves 116 may be configured for providing anywhere between zero percent (0%) and one hundred percent (100%) of the heat exchange fluid from the inlet to the first outlet, and similarly, the bypass valves 116 may be configured for providing anywhere between zero percent (0%) and one hundred percent (100%) of the heat exchange fluid from the inlet to the second outlet.

Notably, the bypass valves 116 are in operable communication with a controller 115 of the turbofan engine 10 and/or of an aircraft including the turbofan engine 10 through one or more wired or wireless communications busses (depicted in phantom). The controller 115 may bypass one or more of the one or more heat sink exchangers 108 and/or heat source exchangers 106 based on, e.g., an operating condition of the turbofan engine 10 and/or aircraft, a temperature of the heat exchange fluid, and/or any other suitable variables. Alternatively, the controller 115 may bypass one or more of the one or more heat sink exchangers 108 and/or heat source exchangers 106 based on a user input. For example, in certain exemplary embodiments, the controller 115 may be configured to operate the thermal management system 100 in the manner described below with reference to FIGS. 3 through 5, and/or in accordance with the method 200 described below with reference to FIG. 9. Further, in certain exemplary embodiments, the controller 115 may be integrated into the controller 82 of FIG. 1, and/or may be configured in a similar manner as the control system 300 described below with reference to FIG. 10.

Further, each bypass line 110 also meets at the respective downstream juncture 114 with the thermal transport bus 102. Between each heat sink exchanger 108 and downstream juncture 114, the thermal transport bus 102 includes a check valve 118 for ensuring a proper flow direction of the heat exchange fluid. More particularly, the check valve 118 prevents a flow of heat exchange fluid from the downstream juncture 114 towards the respective heat sink exchanger 108.

Figure 3:
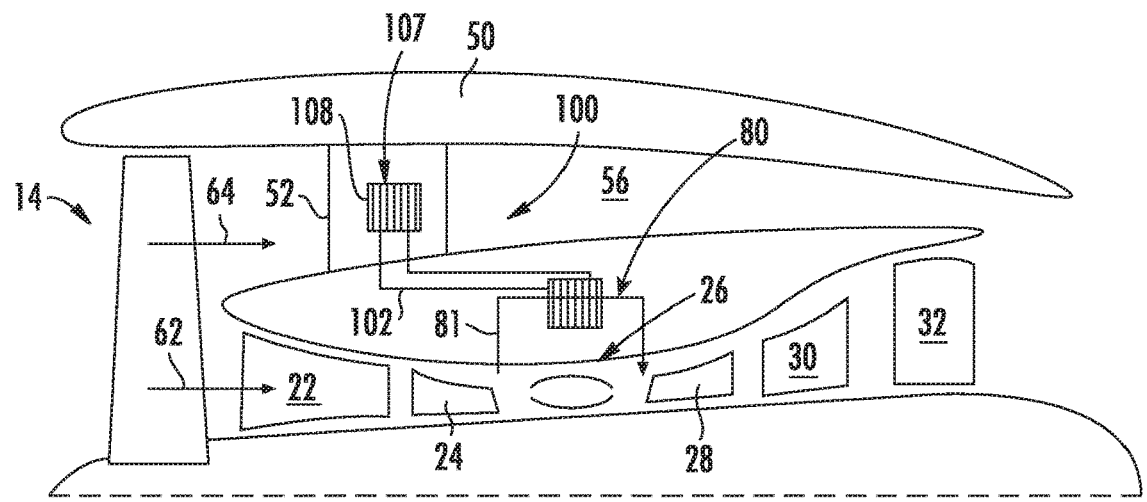
FIG. 3 is a schematic view of a gas turbine engine in accordance with another exemplary embodiment of the present disclosure in a first operating condition.
Figure 4:
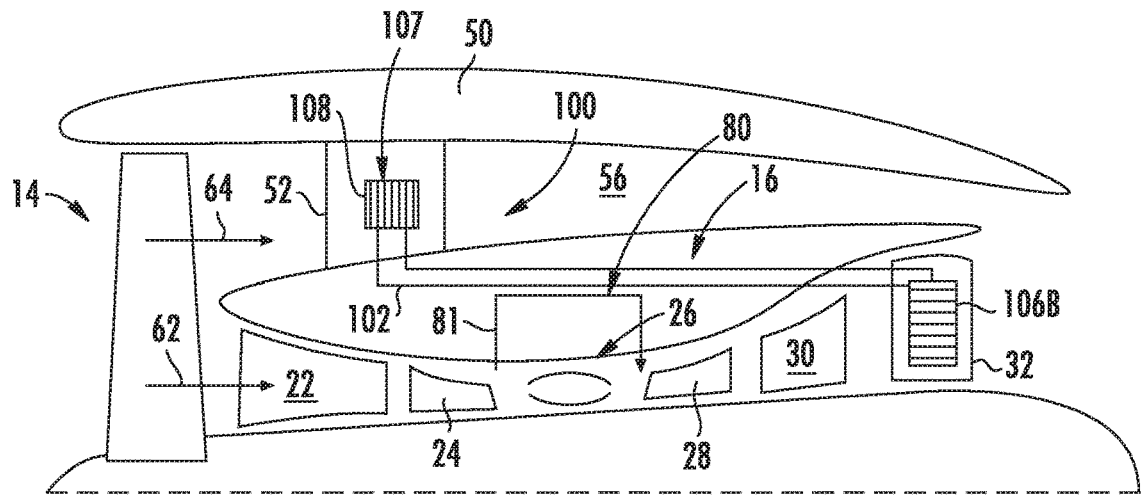
FIG. 4 is a schematic view of the exemplary gas turbine engine of FIG. 3 in a second operating condition.
Figure 5:
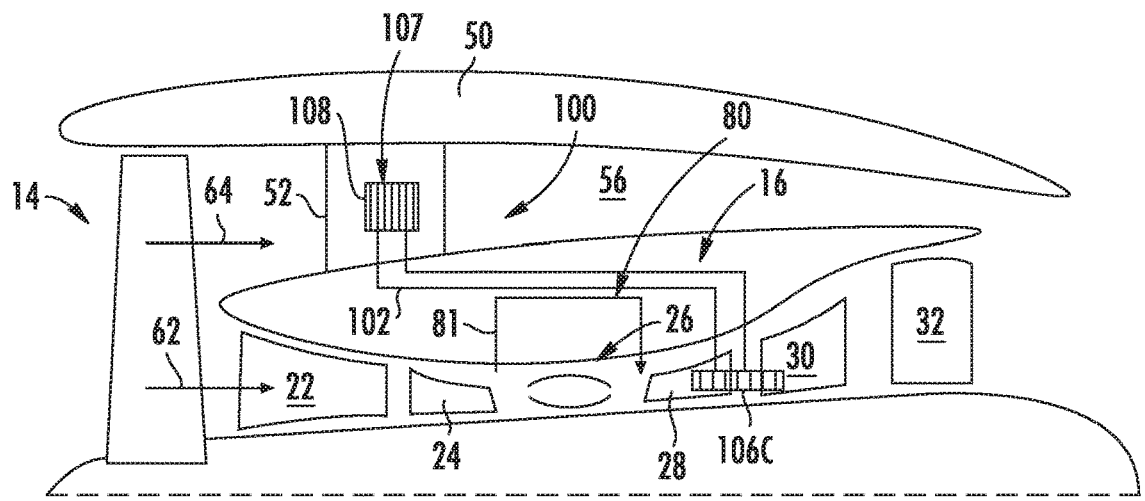
FIG. 5 is a schematic view of the exemplary gas turbine engine of FIG. 3 in a third operating condition.

Referring now to FIGS. 3 through 5, exemplary operations of a thermal management system 100 in accordance with an exemplary aspect of the present disclosure are provided. More specifically, FIG. 3 provides a schematic view of a gas turbine engine and thermal management system 100 in accordance with an exemplary embodiment of the present disclosure, with the thermal management system 100 in a first operating configuration; FIG. 4 provides a schematic view of the exemplary gas turbine engine and thermal management system 100 of FIG. 3, with the thermal management system 100 in a second operating configuration; and FIG. 5 provides a schematic view of the exemplary gas turbine engine and thermal management system 100 of FIG. 3, with the thermal management system 100 in a third operating configuration. The gas turbine engines depicted in FIGS. 3 through 5 may be configured in substantially the same manner as the exemplary turbofan engine 10 described above with reference to FIG. 1, or in accordance with any other suitable gas turbine engine (e.g., a turbofan engine having any other suitable configuration, a turboshaft engine, a turboprop engine, a turbojet engine, etc.). It will also be appreciated that although the engines depicted in FIGS. 3 through 5 may generally be configured for subsonic flight, in other embodiments, aspects of the present disclosure may be incorporated into any suitable supersonic gas turbine engine.

In certain exemplary embodiments, the exemplary gas turbine engine of FIGS. 3 through 5 may be configured in substantially the same manner as the exemplary turbofan engine 10 described above with reference to FIG. 1. For example, as is shown, the gas turbine engine generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. Moreover, the turbomachine 16 and fan section 14 are at least partially surrounded by an outer nacelle 50, with the turbomachine 16 supported relative to the outer nacelle 50 through a plurality of outlet guide vanes 52. The outer nacelle 50 defines a bypass airflow passage 56 with the turbomachine 16. A first portion 62 of an airflow from the fan section 14 is provided through the turbomachine 16 as a core airflow, and a second 64 portion of the airflow from the fan section 14 is provided through the bypass airflow passage 56 as a bypass airflow.

Further, the thermal management system 100 generally includes a plurality of heat source exchangers 106 and a heat sink system 107. The heat sink system 107, for the embodiment shown, includes a heat sink heat exchanger 108 positioned in thermal communication with the bypass airflow passage 56, and more specifically, integrated into one or more of the outlet guide vanes 52 positioned within the bypass airflow passage 56. The plurality of heat source exchangers 106 are thermally connected to the heat sink system 107 through a thermal bus 102.

In addition, the gas turbine engine includes a cooling air system 80 (sometimes also referred to as a "compressor cooling air system" or "cooled cooling air system") for providing (and cooling) air from one or both of the HP compressor 24 or LP compressor 22 to one or both of the HP turbine 28 or LP turbine 30 during operation of the gas turbine engine. The cooling air system 80 includes one or more cooling passages 81 for ducting air from the compressor section to the turbine section, such that the cooling air system 80 may cool one or more components of the turbine section.

Moreover, as discussed above the thermal management system 100 includes a plurality of bypass valves 116 for bypassing one or more features of the thermal management system 100 (not shown; see, e.g., FIG. 2). Such may allow for the thermal management system 100 to selectively thermally connect one or more heat source exchangers 106 with one or more heat exchangers of the heat sink system 107.

For example referring particularly to FIG. 3, for the embodiment shown, the plurality of heat source exchangers 106 includes a first heat source exchanger 106A thermally coupled to the cooling system 80, and more specifically the cooling passage 81 of the cooling system 80, between the compressor section and the turbine section of the gas turbine engine. Additionally, the first heat source exchanger 106A is thermally connected to the heat sink heat exchanger 108 through the thermal bus 102. In such a manner, heat from a cooling airflow through the cooling passage 81 may be transferred through the thermal management system 100 to the bypass airflow passage 56. Such may allow for the turbine section to operate at a higher power level, as the turbine section may be capable of accepting higher temperature and pressure combustion gases with the cooler cooling airflow being provided thereto. Such may be beneficial during relatively high power operations, such as during takeoff and climb operations.

Additionally, referring particularly to FIG. 4, for the embodiment shown, the plurality of heat source exchangers 106 further includes a second heat source exchanger 106B thermally coupled to the exhaust section 32 of the turbomachine 16 to extract heat from the airflow through the exhaust section 32. The second heat source exchanger 106B is, for the embodiment shown, thermally coupled to the heat sink heat exchanger 108 of the heat sink system 107 through the thermal bus 102, such that heat from the exhaust section 32 may be transferred through the thermal management system 100 to the bypass airflow passage 56. In such a manner, the thermal management system 100 may operate as a waste heat recovery system, as waste heat from the exhaust section 32 may be transferred to the airflow through the bypass airflow passage 56, resulting in a more efficient thrust through the bypass airflow passage 56. Such may be beneficial during certain sustained operations below peak power, such as during cruise operations.

Moreover, referring now particularly to FIG. 5, for the embodiment shown, the plurality of heat source exchangers 106 additionally includes a third heat source exchanger 106C thermally coupled to the turbine section to extract heat from the combustion gases through the turbine section. The third heat source exchanger 106C is, for the embodiment shown, thermally connected to the heat sink heat exchanger 108 of the heat sink system 107 through the thermal bus 102. In such a manner, heat from the turbine section may be transferred through the thermal management system 100 to the bypass airflow passage 56. Such may remove energy from the turbine section, slowing down the engine during low-power operations, such as idle operating conditions.

Notably, each of the configurations shown in FIGS. 3 through 5 may be achieved by actuating one or more bypass valves 116 of the thermal management system 100 (see FIG. 2). Accordingly, although for the embodiment shown in FIGS. 3 through 5 the thermal management system 100 is depicted in each Fig. including only one of the first, second, or third heat source exchanger 106A, 106B, 106C and the heat sink exchanger 108, the exemplary thermal management system 100 of FIGS. 3 through 5 includes each of these heat exchangers, and optionally others. However, for the configurations shown, the heat exchangers not depicted for a particular configuration are not thermally coupled to the heat transfer fluid through the thermal bus 102 for such configuration (i.e., such heat exchangers are being bypassed in such configuration). Notably, however, in other exemplary embodiments, the heat exchangers not depicted for a particular configuration may still be thermally connected to, e.g., the thermal bus 102, but may not be operating at full throughput/capacity. For example, such heat exchangers not depicted for a particular configuration may be operating at a reduced throughput/capacity, such that the respective bypass valves 116 for such heat exchangers may be restricting at least about 50% of the heat exchange fluid therethrough (i.e., a 50% reduction in flow by volume from the heat exchanger's capacity), such as at least about 75% of the heat exchange fluid therethrough, such at least 90% of the heat exchange fluid therethrough.

Further, although for the embodiment shown, the heat sink system 107 includes the heat sink heat exchanger 108 positioned in thermal communication with the bypass airflow passage 56, in other embodiments, the heat sink system 107 may additionally, or alternatively, include a separate heat sink heat exchanger 108 configured to reject heat from the thermal management system 100 at any other suitable location (e.g., see FIG. 2). For example, in other embodiments, the heat sink system 107 may additionally, or alternatively, include a fuel heat exchanger configured to transfer heat from the thermal bus 102 to a fuel flow provided to the combustion section.

Inclusion of the thermal management system 100 capable of operating between the various operating modes described herein may result in a more efficient gas turbine engine.

It will be appreciated, however, that in other exemplary embodiments a thermal management system for a gas turbine engine in accordance with the present disclosure may additionally, or alternatively, utilize any other suitable heat source(s), any other suitable heat sink system, transfer heat between any suitable heat source(s) and heat sink system, etc. For example, referring now to FIGS. 6 through 8, schematic views of gas turbine engines including thermal management systems 100 in accordance with other exemplary aspects of the present disclosure are provided. The gas turbine engine and thermal management systems 100 depicted in FIGS. 6 through 8 may be configured in substantially the same manner as the exemplary gas turbine engine and thermal management system 100 of FIGS. 3 through 5. Accordingly, the same or similar numbers may refer to the same or similar part. For example, in certain aspects, one or more of the thermal management systems 100 depicted in FIGS. 6 through 8 may be the same thermal management system 100 of FIGS. 3 through 5, but with the gas turbine engines in a different operating condition.

Figure 6:
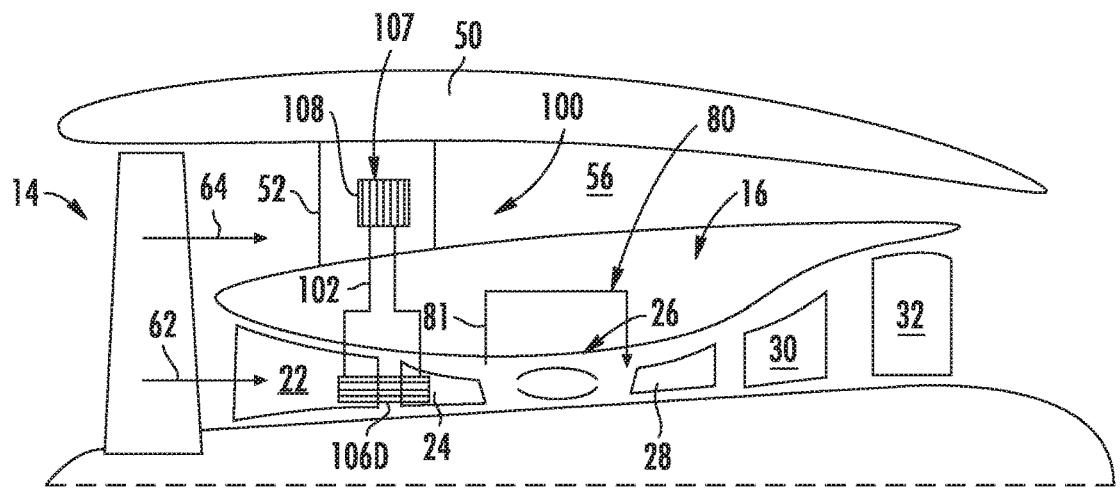
FIG. 6 is a schematic view of a gas turbine engine in accordance with another exemplary embodiment of the present disclosure.
Figure 7:
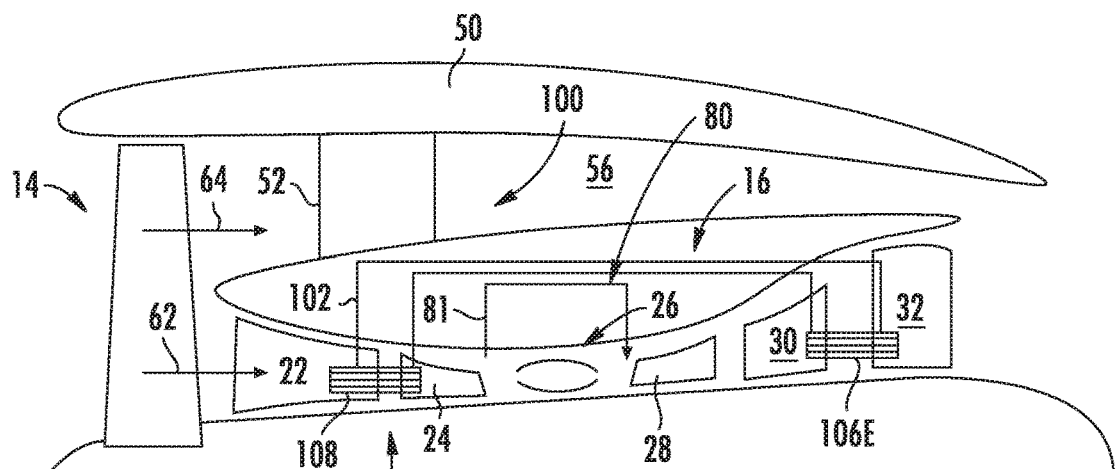
FIG. 7 is a schematic view of a gas turbine engine in accordance with yet another exemplary embodiment of the present disclosure.
Figure 8:
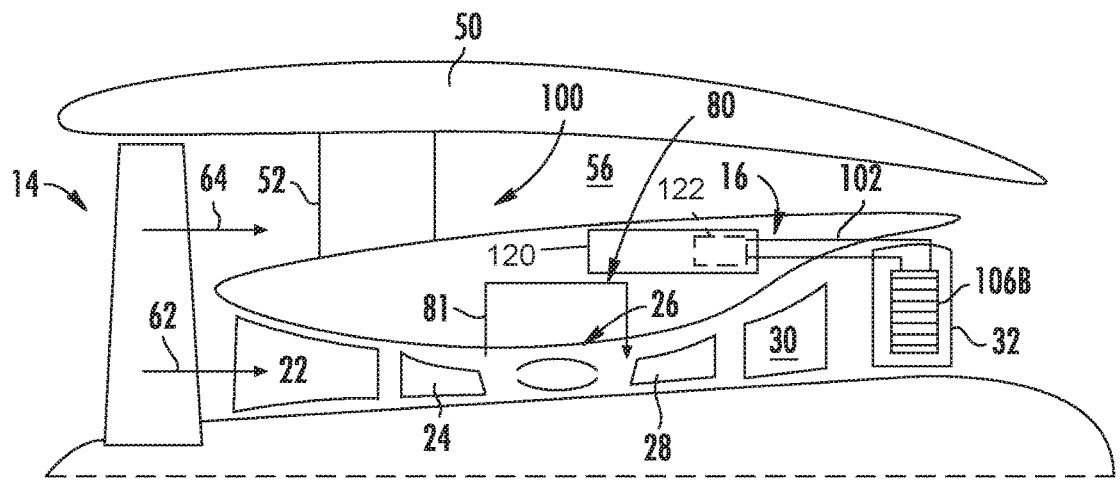
FIG. 8 is a schematic view of a gas turbine engine in accordance with still another exemplary embodiment of the present disclosure.

Referring to FIGS. 6 through 8, generally, the gas turbine engines each generally include a fan section 14 and a turbomachine 16. The turbomachines 16 each include in serial flow order a compressor section having an LP compressor 22 and an HP compressor 24, a combustion section 26, a turbine section including an HP turbine 28 and an LP turbine 30, and an exhaust section 32. Moreover, each turbomachine 16 and fan section 14 are at least partially surrounded by an outer nacelle 50, with each turbomachine 16 supported relative to the outer nacelle 50 through a respective plurality of outlet guide vanes 52. The outer nacelle 50 defines a bypass airflow passage 56 with the turbomachine 16.

Further, each thermal management system 100 generally includes a plurality of heat source exchangers 106 and a heat sink system 107. Moreover, as discussed above, each thermal management system 100 includes a plurality of bypass valves 116 for bypassing one or more features of the thermal management system 100 (not shown; see, e.g., FIG. 2). Such may allow for the thermal management system 100 to selectively thermally connect the one or more heat source exchangers 106 with the one or more heat exchangers of the heat sink system 107.

For example referring particularly to FIG. 6, for the embodiment shown, the plurality of heat source exchangers 106 includes a fourth heat source exchanger 106D thermally coupled to the compressor section of the turbomachine 16 (e.g., the LP compressor 22, the HP compressor 24, or both), and more specifically to both the LP compressor 22 and the HP compressor 24. Additionally, the heat sink system 107 of the thermal management system 100 shown includes a heat sink heat exchanger 108 positioned in thermal communication with the bypass airflow passage 56, and more specifically, integrated into one or more of the outlet guide vanes 52 positioned within the bypass airflow passage 56. The fourth heat source exchanger 106D is thermally connected to the heat sink heat exchanger 108 of the heat sink system 107 through a thermal bus 102. In such a manner, heat from an airflow through the compressor section may be transferred through the thermal management system 100 to the bypass airflow passage 56. Such may allow for the turbine section to operate at a higher power level, as the compressor section may be capable of compressing an airflow to higher pressures (and temperatures) without exceeding temperature limits of the compressor section. Such may be beneficial during relatively high power operations, such as during takeoff and climb operations.

Referring now particularly to FIG. 7, for the embodiment shown, the plurality of heat source exchangers 106 includes a fifth heat source exchanger 106E thermally coupled to the turbomachine 16 downstream of the combustion section 26 (e.g., the turbine section, the exhaust section 32, or both), and more specifically to both the turbine section and the exhaust section 32. Additionally, the heat sink system 107 of the thermal management system 100 shown includes a heat sink heat exchanger 108 positioned in thermal communication with the compressor section of the turbomachine 16 (e.g., the LP compressor 22, the HP compressor 24, or both), and more specifically to both the LP compressor 22 and the HP compressor 24. The fifth heat source exchanger 106E is thermally connected to the heat sink heat exchanger 108 of the heat sink system 107 through a thermal bus 102. In such a manner, heat from an airflow through the turbomachine 16 downstream of the combustion section 26 may be transferred through the thermal management system 100 to the compressor section. Such may allow for heat from the turbine section and/or exhaust section 32 to be transferred to the compressor section. Such may be beneficial during partial power operations, such that heat/energy may be conserved during such operations.

Notably, in at least certain exemplary embodiments, the heat sink exchanger 108 of FIG. 7 may be the same as the fourth source exchanger 106D described above with reference to FIG. 6. Accordingly, it will be appreciated that the terms "heat source" and "heat sink" with reference to heat exchangers are not meant to be limiting, and instead describe the function of the heat exchanger during a particular application.

Referring now particularly to FIG. 8, for the embodiment shown, the plurality of heat source exchangers 106 includes the second heat source exchanger 106B thermally coupled to the exhaust section 32 of the turbomachine 16 to extract heat from the airflow through the exhaust section 32, similar to the exemplary embodiment described above with reference to FIG. 5. However, for the embodiment depicted in FIG. 8, the gas turbine engine further includes a waste heat recovery system 120 (also referred to as a bottoming cycle system), and the heat sink system 107 includes a heat exchanger 122 incorporated into the waste heat recovery system 120 for transferring heat to the waste heat recovery system 120. The waste heat recovery system 120 may convert such heat to power, such as electrical power, which may increase an overall efficiency of the gas turbine engine.

It will further be appreciated that other configurations are contemplated as well. Further, it will be appreciated, that in addition to changing the heat source exchangers based on one or more operating conditions of the gas turbine engine, the thermal management system may change the heat sink exchangers based on the one or more operating conditions of the gas turbine engine.

Figure 9:
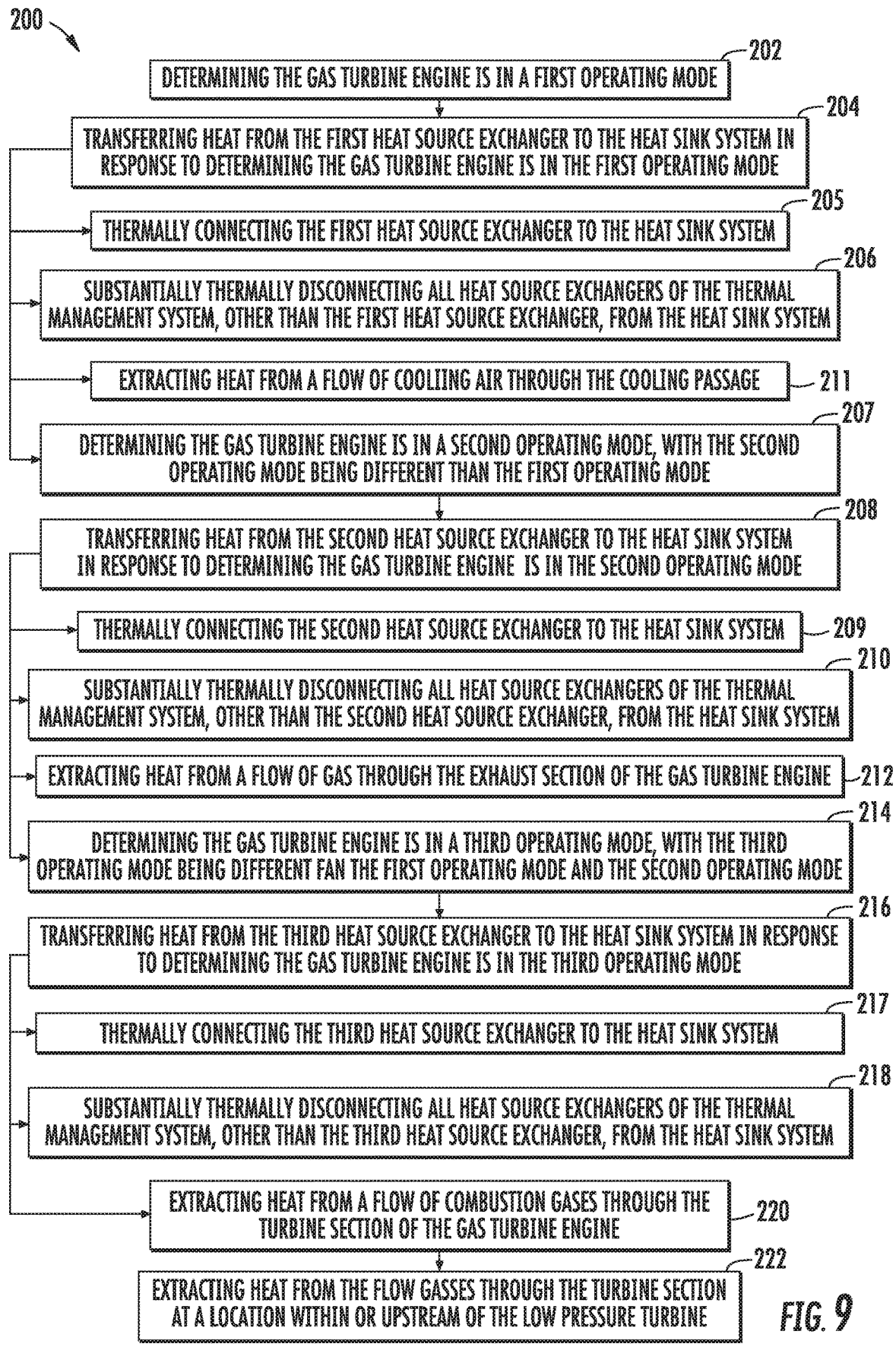
FIG. 9 is a flow diagram of a method for operating a gas turbine engine in accordance with an exemplary aspect of the present disclosure.

Referring now to FIG. 9, a flow diagram of a method 200 for operating a thermal management system of a gas turbine engine is provided. The method 200 may be utilized to operate one or more of the exemplary thermal management systems 100 described above with reference to FIGS. 1 through 5. For example, the thermal management system may generally include a plurality of heat source exchangers (such as a first heat source exchanger and a second heat source exchanger), a heat sink system, and a thermal bus thermally connecting the plurality of heat source exchangers and heat sink system. Additionally, the method 200 may be implemented by one or more controllers, such as using the exemplary computing system 300 depicted in FIG. 10.

The method 200 generally includes at (202) determining the gas turbine engine is in a first operating mode. The method 200 additionally includes at (204) transferring heat from the first heat source exchanger to the heat sink system in response to determining the gas turbine engine is in the first operating mode at (202). For the exemplary aspect of FIG. 9, the first heat source exchanger is thermally coupled to a first system or component of the gas turbine engine. The first system or component of the gas turbine engine is, for the exemplary aspect depicted, one of a cooling passage between a compressor section and a turbine section of the gas turbine engine, an exhaust section of the gas turbine engine, or a turbine section of the gas turbine engine.

More specifically, for the exemplary aspect depicted, transferring heat from the first heat source exchanger to the heat sink system at (204) includes at (205) thermally connecting the first heat source exchanger to the heat sink system, and at (206) substantially thermally disconnecting all heat source exchangers of the thermal management system, other than the first heat source exchanger, from the heat sink system. For example, in certain exemplary aspects, transferring heat from the first heat source exchanger to the heat sink system at (204) may include completely thermally disconnecting all heat source exchangers of the thermal management system, other than the second heat source exchanger, from the heat sink system. It should be appreciated, that as used herein, the term "substantially thermally disconnecting," with respect to a heat exchanger, refers to reducing a heat exchange fluid flow through such heat exchanger to less than about 50% capacity, and the term "completely thermally disconnecting," with respect to a heat exchanger, refers to reducing a heat exchange fluid flow through such heat exchanger to less than about 10% capacity. In each of these cases, the term "capacity" refers to a maximum flow volume during normal operations of the thermal management system.

Referring still to FIG. 9, the method 200 includes at (207) determining the gas turbine engine is in a second operating mode, with the second operating mode being different than the first operating mode. Further, the method 200 includes at (208) transferring heat from the second heat source exchanger to the heat sink system in response to determining the gas turbine engine is in the second operating mode at (207). The second heat source exchanger is thermally coupled to a second system or component of the gas turbine engine, the second system or component being different than the first system or component. More specifically, for the exemplary aspect of FIG. 9, the second system or component of the gas turbine engine is a different one of the cooling passage, the exhaust section of the gas turbine engine, or the turbine section of the gas turbine engine than the first heat source exchanger. Further, for the exemplary aspect depicted, transferring heat from the second heat source exchanger to the heat sink system at (208) includes at (209) thermally connecting the second heat source exchanger to the heat sink system, and at (210) substantially thermally disconnecting all heat source exchangers of the thermal management system, other than the second heat source exchanger, from the heat sink system. For example, in certain exemplary aspects, transferring heat from the second heat source exchanger to the heat sink system at (208) may include completely thermally disconnecting all heat source exchangers of the thermal management system, other than the second heat source exchanger, from the heat sink system.

Notably, in certain exemplary aspects, the heat sink system may include a heat sink exchanger positioned to provide heat to a bypass airflow through a bypass airflow passage of the gas turbine engine. For example, the heat sink exchanger may be integrated into, e.g., an outlet guide vane of the gas turbine engine (see, e.g., FIGS. 2 through 5). Additionally, or alternatively, the heat sink system may include a heat sink exchanger positioned to transfer heat to a fuel flow to a combustion section of the gas turbine engine.

In the exemplary aspect depicted in FIG. 9, the first heat source exchanger is thermally coupled to the cooling passage between the compressor section and the turbine section of the gas turbine engine (see also FIG. 3, above). With such an exemplary aspect, transferring heat from the first heat source exchanger to the heat sink system at (204) includes at (211) extracting heat from a flow of cooling air through the cooling passage. Notably, also with such an exemplary aspect, the first operating mode may be a high-power output operating mode. For example, the first operating mode may be a takeoff operating mode, a climb operating mode, etc. By extracting heat from the flow of cooling air through the cooling passage at (211), the thermal management system may allow for the engine to produce more power, as the cooling air from the cooling passage, provided to the turbine section, may allow for the turbine section to accept combustion gases from the combustion section at a higher pressure and/or temperature.

Additionally, for the exemplary aspect of FIG. 9, the second heat source exchanger of the plurality of heat source exchangers of the thermal management system is thermally coupled to the exhaust section of the gas turbine engine (see also FIG. 4, above). With such an exemplary aspect, transferring heat from the second heat source exchanger to the heat sink system at (208) may further include at (212) extracting heat from a flow of gas through the exhaust section of the gas turbine engine. Notably, with such an exemplary aspect, the second operating mode may be a cruise operating mode, or some other sustained operating mode where high efficiency is desired. By extracting heat from the exhaust section of the gas turbine engine, waste heat from the gases therein may be transferred to, e.g., the bypass airflow passage such that the airflow through the bypass airflow passage may generate additional thrust, therefore increasing an efficiency of the gas turbine engine. (Notably, when the heat sink system includes a heat sink exchanger thermally coupled to the fuel provided to the combustion section, the increase in temperature of the fuel provided the combustion section may also increase an efficiency of the gas turbine engine.)

Further, for the exemplary aspect of FIG. 9 the plurality of heat source exchangers of the thermal management system additionally includes a third heat source exchanger. With such an exemplary aspect, the method further includes at (214) determining the gas turbine engine is in a third operating mode, with the third operating mode being different fan the first operating mode and the second operating mode. Moreover, the method 200 includes at (216) transferring heat from the third heat source exchanger to the heat sink system in response to determining the gas turbine engine is in the third operating mode at (214). The third heat source exchanger is thermally coupled to a third system or component of the gas turbine engine, the third system or component being different than the first system or component and different than the second system or component. More specifically, for the exemplary aspect depicted, the third system or component of the gas turbine engine is a different one of the cooling passage, the exhaust of the gas turbine engine, or the turbine section of the gas turbine engine than the first and second heat source exchangers.

Further, for the exemplary aspect depicted, transferring heat from the third heat source exchanger to the heat sink system at (216) includes at (217) thermally connecting the third heat source exchanger to the heat sink system, and at (218) substantially thermally disconnecting all heat source exchangers of the thermal management system, other than the third heat source exchanger, from the heat sink system. For example, in certain exemplary aspects, transferring heat from the third heat source exchanger to the heat sink system at (216) may include completely thermally disconnecting all heat source exchangers of the thermal management system, other than the third heat source exchanger, from the heat sink system.

Further, still, for the exemplary aspect depicted the third heat source exchanger is thermally coupled to the turbine section of the gas turbine engine (see also FIG. 5, above). Accordingly, with such an exemplary aspect, transferring heat from the third heat source exchanger to the heat sink system at (216) may further include at (220) extracting heat from a flow of combustion gases through the turbine section of the gas turbine engine. For example, in certain exemplary aspects, the turbine section may include a high pressure turbine and a low pressure turbine, and extracting heat from the flow of combustion gasses through the turbine section of the gas turbine engine at (220) may include at (222) extracting heat from the flow gasses through the turbine section at a location within or upstream of the low pressure turbine.

Notably, also, with such an exemplary aspect, the third operating mode may be a low power mode, such as an idle operating mode wherein an amount of power from the engine is desired to be minimized. By extracting heat from the turbine section of the gas turbine engine, heat from the combustion gases therein may be transferred to, e.g., the bypass airflow passage such that the airflow through the bypass airflow passage to slow down an operating of the turbine section of the engine.

However, in other exemplary aspects, any other suitable system or component of the gas turbine engine may be utilized as the heat source for the first heat source exchanger, the second heat source exchanger, the third heat source exchanger, etc. For example, in certain exemplary aspects, an inlet to the gas turbine engine (e.g., when utilized with supersonic gas turbine engines) may be a heat source for one or more of the first heat source exchanger, the second heat source exchanger, or the third heat source exchanger. Further, it will be appreciated that in certain exemplary aspects, the heat sink system may utilize any suitable heat sink. For example, the heat sink system may include a heat sink exchanger positioned to provide heat to a bypass airflow through a bypass airflow passage of the gas turbine engine. However, in other exemplary aspects, the heat sink system may additionally, or alternatively, include a heat sink exchanger configured to provide heat to a fuel system, a de-icing system, and/or an inlet to the gas turbine engine (e.g., during certain operations when the system is utilized with a supersonic gas turbine engine).

It will be appreciated that operating in thermal management system and gas turbine engine in accordance with one or more of the exemplary aspects described herein with reference to FIG. 9 may result in an overall more efficient gas turbine engine. Specifically, operating in thermal management system in accordance with one or more these exemplary aspects may conserve heat and utilize such conserved heat to increase an efficiency of the gas turbine engine.

Figure 10:
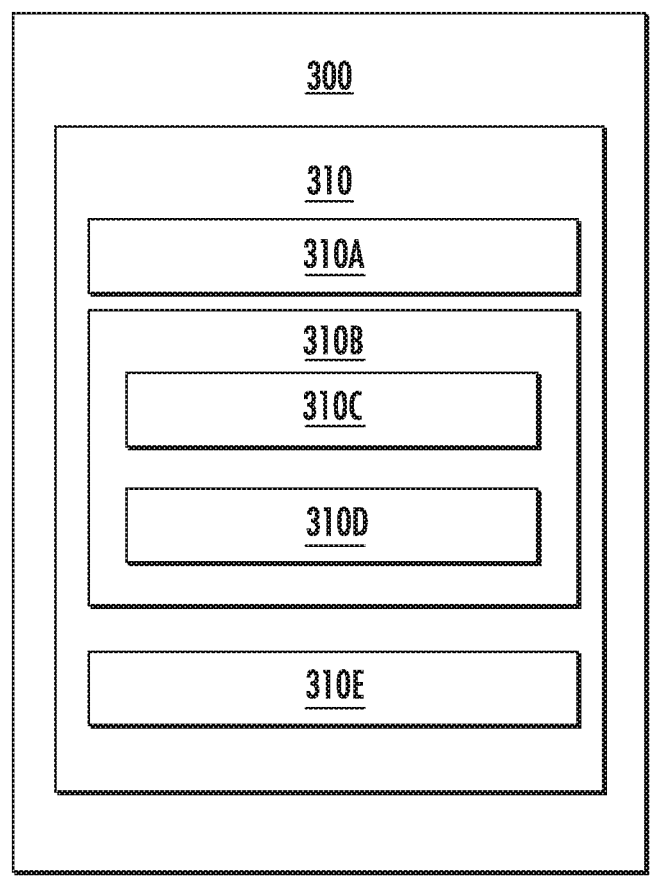
FIG. 10 depicts a computing system according to example aspects of the present disclosure.

Referring now to FIG. 10, an example computing system 300 according to example embodiments of the present disclosure is depicted. The computing system 300 can be used, for example, as a controller 115, 82 of a thermal management system 100/gas turbine engine. The computing system 300 can include one or more computing device(s) 310. The computing device(s) 310 can include one or more processor(s) 310A and one or more memory device(s) 310B. The one or more processor(s) 310A can include any suitable processing device, such as a microprocessor, microcontroller, integrated circuit, logic device, and/or other suitable processing device. The one or more memory device(s) 310B can include one or more computer-readable media, including, but not limited to, non-transitory computer-readable media, RAM, ROM, hard drives, flash drives, and/or other memory devices.

The one or more memory device(s) 310B can store information accessible by the one or more processor(s) 310A, including computer-readable instructions 310C that can be executed by the one or more processor(s) 310A. The instructions 310C can be any set of instructions that when executed by the one or more processor(s) 310A, cause the one or more processor(s) 310A to perform operations. In some embodiments, the instructions 310C can be executed by the one or more processor(s) 310A to cause the one or more processor(s) 310A to perform operations, such as any of the operations and functions for which the computing system 300 and/or the computing device(s) 310 are configured, the operations for operating a thermal management system (e.g, method 200), as described herein, and/or any other operations or functions of the one or more computing device(s) 310. The instructions 310C can be software written in any suitable programming language or can be implemented in hardware. Additionally, and/or alternatively, the instructions 310C can be executed in logically and/or virtually separate threads on processor(s) 310A. The memory device(s) 310B can further store data 310D that can be accessed by the processor(s) 310A. For example, the data 310D can include data indicative of power flows, data indicative of engine/aircraft operating conditions, and/or any other data and/or information described herein.

The computing device(s) 310 can also include a network interface 310E used to communicate, for example, with the other components of system 300 (e.g., via a network). The network interface 310E can include any suitable components for interfacing with one or more network(s), including for example, transmitters, receivers, ports, controllers, antennas, and/or other suitable components. One or more external display devices (not depicted) can be configured to receive one or more commands from the computing device(s) 310.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a thermal management system for a gas turbine engine, the method comprising:
   determining the gas turbine engine is in a first operating mode;
   transferring heat from a first heat source exchanger to a heat sink system while bypassing a second heat source exchanger via a second bypass line around the second heat source exchanger in response to determining the gas turbine engine is in the first operation mode, the first heat source exchanger thermally coupled to a first system or component of the gas turbine engine;
   determining the gas turbine engine is in a second operating mode, the second operating mode being different than the first operating mode; and
   transferring heat from the second heat source exchanger to the heat sink system while bypassing the first heat source exchanger via a first bypass line around the first heat source exchanger in response to determining the gas turbine engine is in the second operation mode, the second heat source exchanger thermally coupled to a second system or component of the gas turbine engine,
   wherein the second system or component is different than the first system or component.

2. The method of claim 1,
   wherein the first system or component of the gas turbine engine is one of a cooling passage between a compressor section and a turbine section of the gas turbine engine, an exhaust section of the gas turbine engine, or the turbine section of the gas turbine engine, and
   wherein the second system or component is a different one of the cooling passage, the exhaust section of the gas turbine engine, or the turbine section of the gas turbine engine.

3. The method of claim 2, wherein the first heat source exchanger is thermally coupled to the cooling passage between the compressor section and the turbine section of the gas turbine engine.

4. The method of claim 3, wherein the transferring heat from the first heat source exchanger to the heat sink system comprises extracting heat from a flow of cooling air through the cooling passage.

5. The method of claim 2, wherein the second heat source exchanger is thermally coupled to the exhaust section of the gas turbine engine.

6. The method of claim 5, wherein the transferring heat from the second heat source exchanger to the heat sink system comprises extracting heat from a flow of gas through the exhaust section of the gas turbine engine.

7. The method of claim 1,
wherein the first operating mode is a takeoff operating mode or a climb operating mode, and
wherein the second operating mode is a cruise operating mode.

8. The method of claim 1, further comprising:
determining the gas turbine engine is in a third operating mode, the third operating mode being different than the first operating mode and the second operating mode; and
transferring heat from a third heat source exchanger to the heat sink system in response to determining the gas turbine engine is in the third operation mode, the third heat source exchanger thermally coupled to a third system or component of the gas turbine engine, the third system or component being different than the first system or component and different than the second system or component.

9. The method of claim 8, wherein the third system or component is one of a cooling passage between a compressor section and a turbine section of the gas turbine engine, an exhaust section of the gas turbine engine, or the turbine section of the gas turbine engine.

10. The method of claim 9,
wherein the third heat source exchanger is thermally coupled to the turbine section of the gas turbine engine, and
wherein the transferring heat from the third heat source exchanger to the heat sink system comprises extracting heat from a flow of gases through the turbine section of the gas turbine engine.

11. The method of claim 10,
wherein the turbine section comprises a high pressure turbine and a low pressure turbine, and
wherein the extracting heat from the flow of gases through the turbine section of the gas turbine engine comprises extracting heat from the flow of gases through the turbine section at a location within or upstream of the low pressure turbine.

12. The method of claim 9, wherein the third operating mode is an idle operating mode.

13. The method of claim 1,
wherein the transferring heat from the first heat source exchanger to the heat sink system includes thermally connecting the first heat source exchanger to the heat sink system, and
wherein the transferring heat from the second heat source exchanger to the heat sink system includes thermally connecting the second heat source exchanger to the heat sink system.

14. The method of claim 1,
wherein the transferring heat from the first heat source exchanger to the heat sink system further includes substantially thermally disconnecting all heat source exchangers of the thermal management system, other than the first heat source exchanger, from the heat sink system, and
wherein the transferring heat from the second heat source exchanger to the heat sink system further includes substantially thermally disconnecting all heat source exchangers of the thermal management system, other than the second heat source exchanger, from the heat sink system.

15. The method of claim 1, wherein the heat sink system includes a heat sink exchanger positioned to provide heat to a bypass airflow through a bypass airflow passage of the gas turbine engine.

16. The method of claim 1,
wherein the first system or component of the gas turbine engine is one of a compressor section of the gas turbine engine or a turbine section of the gas turbine engine, and
wherein the second system or component is a different one of the compressor section of the gas turbine engine or the turbine section of the gas turbine engine.

17. The method of claim 1, wherein the first heat source exchanger and the second heat source exchanger are in series.

\* \* \* \* \*